United States Patent [19]

Leistner

[11] Patent Number: 5,606,794
[45] Date of Patent: Mar. 4, 1997

[54] VARIABLE IMPACT TEE-NUT INSERTION MACHINE

[75] Inventor: Volkmar W. Leistner, Toronto, Canada

[73] Assignee: Sigma Tool & Machine, Scarborough, Canada

[21] Appl. No.: 498,877

[22] Filed: Jul. 6, 1995

[51] Int. Cl.⁶ .................................................. B23P 19/00
[52] U.S. Cl. ............................................. 29/798; 227/130
[58] Field of Search ..................... 29/809, 798; 227/130, 227/147

[56] References Cited

U.S. PATENT DOCUMENTS

| | | | |
|---|---|---|---|
| 3,979,040 | 9/1976 | Denin | 227/147 |
| 4,120,438 | 10/1978 | Litch | 227/147 |
| 4,313,552 | 2/1982 | Maurer | 227/130 |
| 4,821,940 | 4/1989 | Rotherham . | |
| 5,323,531 | 6/1994 | Leistner et al. | 29/798 |
| 5,538,172 | 7/1996 | Jochum et al. | 227/130 |

*Primary Examiner*—P. W. Echols
*Assistant Examiner*—Adrian L. Coley

[57] ABSTRACT

A machine for inserting a Tee-nut into a workpiece of the type having a Tee-nut supplying source and a power cylinder assembly, the power cylinder assembly comprising a cylinder having an upper end headplate and a lower end headplate, openings provided on the cylinder for admitting and venting compressed air, a piston moveable within the cylinder, a piston rod secured to the piston, the lower end of the piston rod extending through the lower end headplate and adapted to engage and drive a Tee-nut into a workpiece, the upper end of the piston rod extending through the upper end headplate, and a kinetic energy storage unit removably mounted to the upper end of the piston rod, thereby providing a mass on the piston which is accelerated by gravity and air pressure during a downward stroke and is sufficient to drive a Tee-nut into a workpiece with a very low shock effect and to a precise depth. A kit for retrofitting and converting an existing Tee-nut insertion machine to a variable impact Tee-nut insertion machine is also disclosed.

20 Claims, 3 Drawing Sheets

VARIABLE IMPACT TEE-NUT INSERTION MACHINE

FIELD OF THE INVENTION

The invention relates to a Tee-nut insertion machine and in particular to an insertion machine in which the Tee-nut is inserted at a low velocity where the impact force can be modified, and with a reduced consumption of compressed air.

BACKGROUND OF THE INVENTION

Numerous patents illustrate Tee-nut insertion machines. Such Tee-nuts are widely used for example in the furniture industry. They consist of a threaded sleeve, and a relatively wide flange or head, all being made integrally out of sheet metal. Teeth or prongs extend from the flange or head. Such nuts are inserted into wooden items of the furniture. They serve as a point of attachment for securing a threaded fastener.

Almost all such machines are operated by compressed air, powering a power cylinder which is connected to an insertion plunger. Almost all such machines employ some form of magazine or Tee-nut supply system for supplying Tee-nuts to the plunger. Such machines are usually operated by an operator, who must stand at the machine and hold the wooden workpiece in position in registration with the Tee-nut. He must locate the precise point for insertion of the Tee-nut in registration with the Tee-nut and then activate the machine. This is usually done by means of a foot pedal. Obviously wide variations are possible on this system, but this system described is the system in widest use. Most such machines operate on a downward insertion cycle. In this system the Tee-nut and plunger are located above the wooden workpiece. The wooden workpiece rests on a wooden rest. Upon activation, the plunger descends downwardly, and picks up a Tee-nut, and forces it into the workpiece.

There are, however, variations on this in which an upward insertion system is used. In this system the plunger and Tee-nut are located below the wooden workpiece, and the rest or stop is located above the plunger.

Generally speaking, such systems employ air cylinders, in which the piston is forced downwardly (or upwardly in some cases) at a high velocity, so as to provide sufficient force to drive the Tee-nut into the workpiece. Usually the Tee-nut is being driven into a pre-drilled hole, but in some cases the Tee-nut is simply driven directly into the workpiece and the plunger punches a hole in the workpiece, as the same time as the nut is inserted. An example of this system of self punching Tee-nut is shown in U.S. Letters Patent 5,323,531 dated Jun. 28, 1994 Title: Self Punching Tee-Nut Insertion Machine, Inventor: Walter H. Leistner et al.

It has now been found that the high velocity air cylinder form of driving mechanism has certain disadvantages.

In the first place, the relatively high speed of the piston and plunger set up severe shock and vibrations in the workpiece which can damage the workpiece.

Secondly, such systems result in relatively high consumption of compressed air for each stroke. While this may not be a significant factor in some cases, it does mean that in a large factory very substantial compressed air supplies must be provided, in order to ensure sufficient compressed air for the operation of multiple machines.

A third factor is that the depth of insertion of Tee-nuts into a workpiece may vary due to the hardness of the workpiece. Since the workpiece may be made of processed wooden materials or synthetic non-wooden materials of variable densities, different workpieces may be of different hardness. The plunger of a high velocity Tee-nut insertion machine may cause Tee-nuts to be inserted undesirably deeper into the surfaces of the workpiece of lower density and damage its structure.

BRIEF SUMMARY OF THE INVENTION

With a view to overcome the above-mentioned disadvantages, the present invention provides a variable impact Tee-nut insertion machine for inserting a Tee-nut into a workpiece of the type having means for supporting said workpiece, means for supplying Tee-nuts to the machine, and means for driving said Tee-nut into said workpiece, said driving means comprising cylinder means having a first end member and a second end member; openings means provided on said cylinder means for admitting and venting compressed air from a compressed air supply source; piston means moveable within said cylinder means by said compressed air; piston rod means being secured to said piston means, one end of said piston rod means extending through said first end member of said cylinder and being adapted to engage and drive a said Tee-nut into said workpiece, and the other end of said piston rod means extending through said second end member of said cylinder means; and weight means removeably mounted to said other end of said piston rod means, thereby providing predetermined mass on said piston means at a downward stroke for driving said Tee-nut into said workpiece by the use of low air pressure and high mass energy.

The invention further provides a variable impact Tee-nut insertion machine wherein said piston rod means is in the form of a first piston rod being secured to said piston means at one end of said first piston rod, and the other end of said first piston rod extending out through said first end member of said cylinder means, said other end of said first piston rod being adapted to engage and drive a said Tee-nut into said workpiece; and a second piston rod being secured to said piston means at one end of said second piston rod, and the other end of said second piston rod extending out through said second end member of said cylinder means, said second piston rod extending contiguously from and disposed in a co-axial relationship with said first piston rod.

The invention further provides a variable impact Tee-nut insertion machine wherein said piston rod means is in the form of a single solid metal rod.

The invention further provides a variable impact Tee-nut insertion machine wherein said weight means comprises a bore at one end thereof for receiving said other end of said piston rod means.

The invention further provides a variable impact Tee-nut insertion machine wherein said weight means further comprises means for releasably fastening said weight means to said other end of said piston rod means.

The invention further provides a variable impact Tee-nut insertion machine wherein said weight means is cylindrical in shape and is disposed in a co-axial relationship with said piston rod means.

The invention further provides a variable impact Tee-nut insertion machine wherein said weight means is made of solid metal.

The invention further provides a variable impact Tee-nut insertion machine wherein said first end member is in the form of a headplate having a central bore for receiving therethrough said one end of said piston rod means, and said second end member is in the form of a headplate having a central bore for receiving therethrough said other end of said piston rod means.

The invention further provides a variable impact Tee-nut insertion machine wherein said second end member headplate further comprises an integral collar member extending outwardly therefrom, said collar member defining an elongated bore extending continuously from said central bore of said second end member headplate.

The invention further provides a variable impact Tee-nut insertion machine wherein said piston means defines a central through hole for receiving said piston rod means.

The invention further provides a variable impact Tee-nut insertion machine further comprising means for fastening said piston rod means to said piston means.

The invention further provides a variable impact Tee-nut insertion machine further comprising buffer means provided in both ends of said cylinder means.

The invention further provides a variable impact Tee-nut insertion machine wherein the impact variation is achieved by setting different air pressures for either upstroke or downstroke of the piston-plunger unit.

The invention further provides a kit for retrofitting a machine for inserting a Tee-nut into a workpiece of the type having a cylinder means, said cylinder means having an upper end headplate and a lower end headplate, piston means moveable within said cylinder means, piston rod means being secured to said piston means at one end of said piston rod means, and the other end of said piston rod means extending out through said lower end headplate of said cylinder means at the other end thereof, said other end of said piston rod means being adapted to engage and drive a said Tee-nut into said workpiece, said kit comprising means for extending the piston rod adapted to extend out through said upper end headplate of said cylinder means at the other end thereof, said piston rod extension means being adapted to be disposed in a co-axial relationship with said piston rod means of said machine; and a plurality of weight means adapted to be removeably mounted to said other end of said piston rod extension means, thereby providing a kinetic energy storage unit on said piston means for driving said Tee-nut into said workpiece by the use of air pressure. The piston rod extension provides extra guidance for the piston and the plunger which positions the Tee-nut more precisely.

The invention further provides a kit for retrofitting a Tee-nut insertion machine wherein said plurality of kinetic energy storage units have different dimensions and weights.

The invention also provides a kit for retrofitting a Tee-nut insertion machine, and comprising an upper headplate having an integral collar member extending outwardly therefrom, said collar member defining an elongated bore for receiving said piston rod extension means therethrough for assisting in guiding said piston rod.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
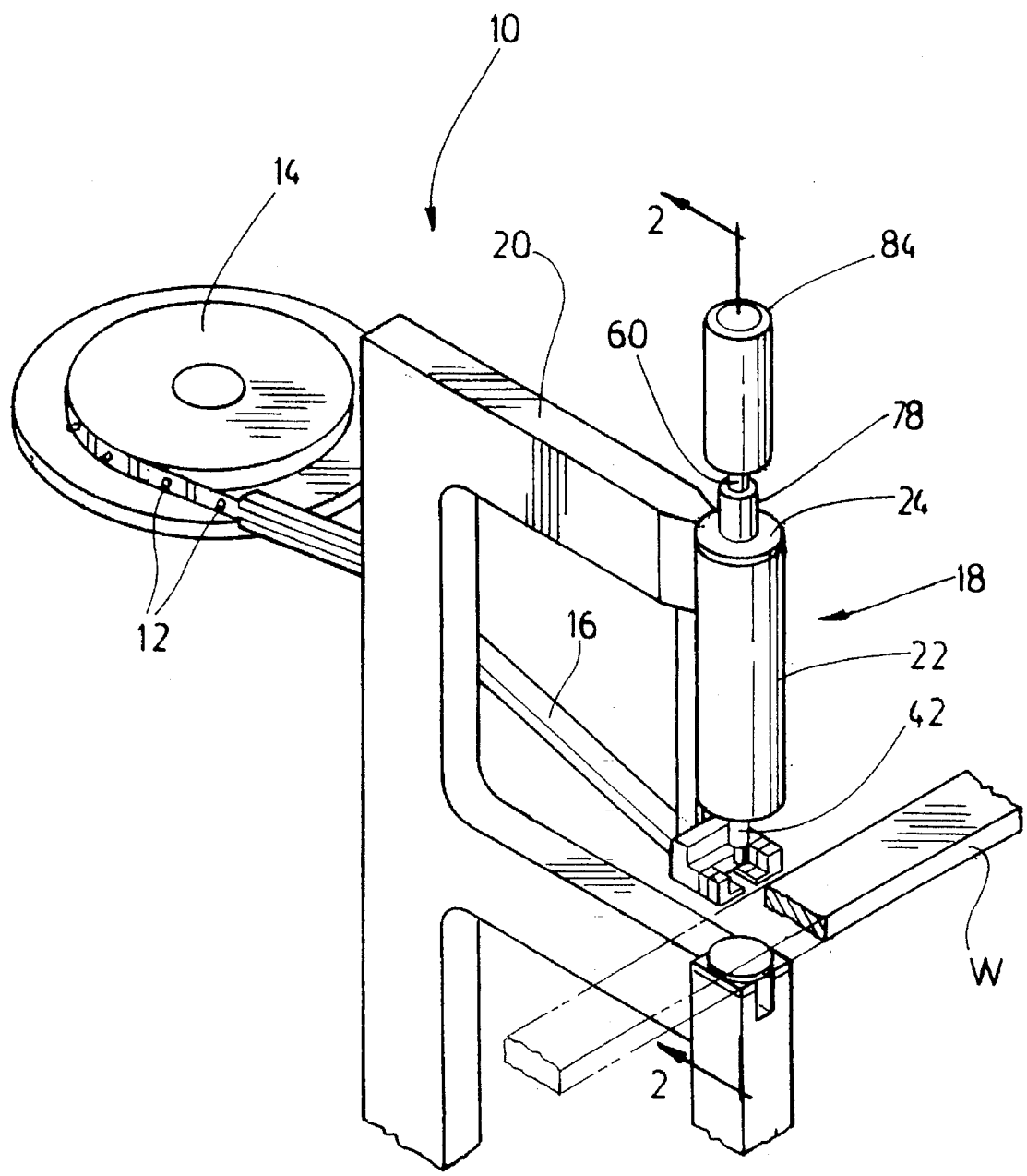
FIG. 1 is a perspective view of a variable impact Tee-nut insertion machine in accordance with one embodiment of the present invention.

Referring now in more detail to the drawings, in which like reference numerals represent like parts throughout the several views, FIG. 1 is a Tee-nut insertion machine, designated generally by reference numeral 10, illustrating an embodiment of the present invention.

In this type of Tee-nut insertion machine, Tee-nuts 12 are supplied from a supply source, e.g. a magazine, or a roll 14 and are fed along a twisting feed guide channel 16. At the end of the feed guide channel 16, an end-most Tee-nut is adapted to be separated from the roll 14 for insertion into a workpiece W.

It is understood that the Tee-nuts 12 may alternatively be supplied from a hopper (not shown).

The workpiece W may be manually loaded onto the machine 10 and, in some cases, may be supported thereon by any suitable device, such as guide rails or clamps (not shown), or may be the hands of an operator so that the workpiece W is in position for Tee-nut insertion.

The Tee-nut insertion machine 10 is preferably of the downward insertion type. That is to say, the Tee-nuts 12 is inserted from above downward into the workpiece The Tee-nut insertion machine 10 comprises a power air cylinder assembly generally represented by reference numeral 18. The power air cylinder assembly 18 is used to provide the insertion machine with necessary force to punch the Tee-nut 12 into the workpiece W. The air cylinder assembly 18 is mounted on a frame 20 of the Tee-nut insertion machine 10, as best illustrated in FIG. 1.

Figures 2, 4:
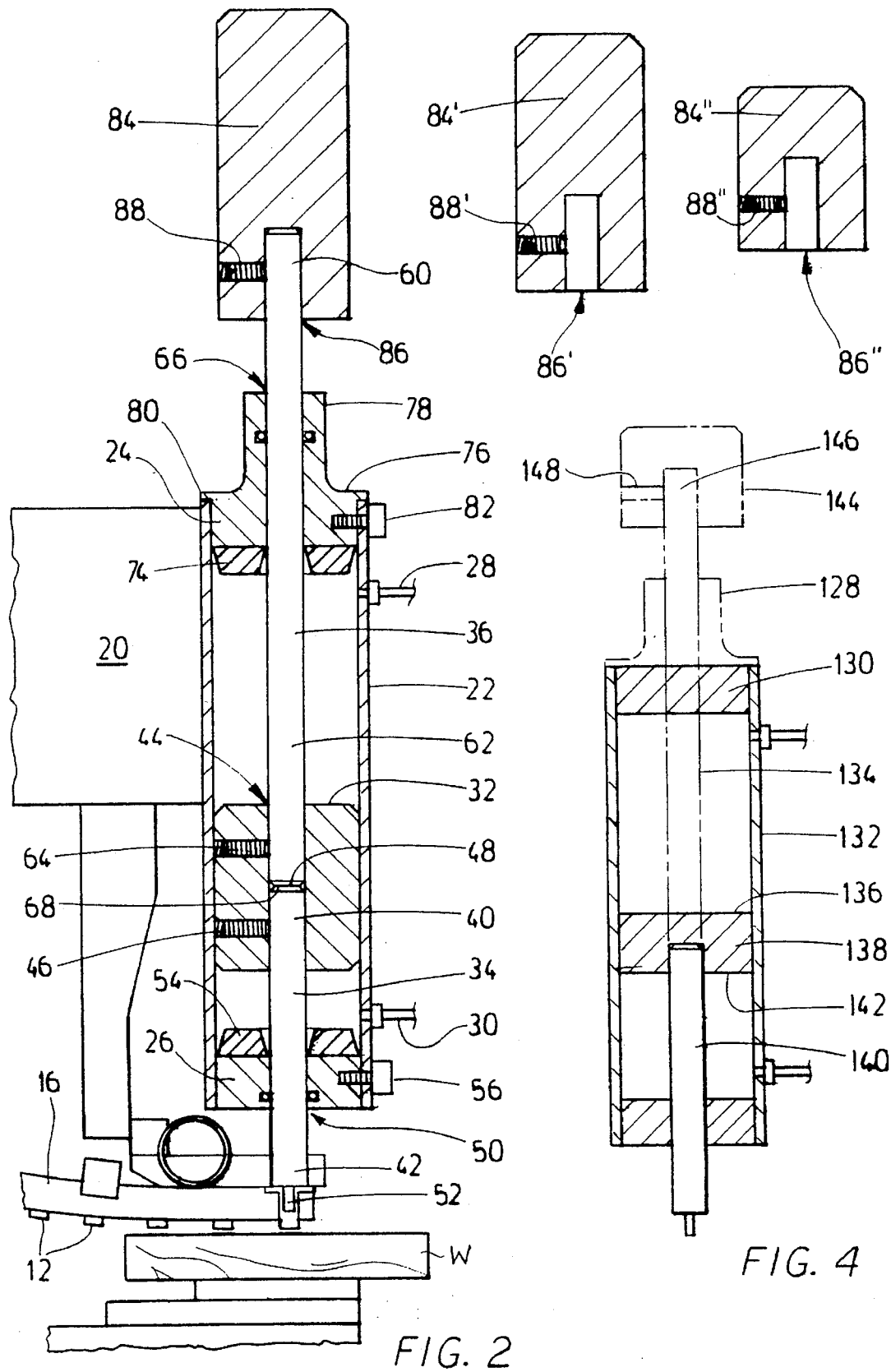
FIG. 2 is a cross sectional view along line 2—2 of FIG. 1 showing the detailed construction of a power cylinder of the Tee-nut insertion machine.
FIG. 4 is an illustrative diagram illustrating the possible retrofitting of an existing Tee-nut insertion machine into a variable impact Tee-nut insertion machine of the present invention.

As shown in FIG. 2, the power air cylinder assembly 18 comprises a cylinder 22 typically powered by air pressure. The cylinder 22 has an upper end headplate 24, a lower end headplate 26, and hoses 28, 30 for admitting and venting air.

The cylinder 22 is preferred to be adjustably secured on the frame 20 of the Tee-nut insertion machine 10 so that the cylinder 22 is adjustable vertically towards and away from the workpiece W.

Within the cylinder 22 there is provided a piston 32 reciprocally moveable within the cylinder 22. The piston 32 has a diameter appropriate enough to make a good sliding fit within the cylinder 22. The piston 32 may be of a certain length in order to provide the piston itself with a certain mass.

The piston 32 is preferably made of solid metallic construction so as to optimize its mass for the purposes to be described below.

It is understood that cylinders and pistons of different constructions and dimensions may be employed to provide the Tee-nut insertion machine 10 with the desired mass and air pressure for different operations.

According to the present embodiment, the power air cylinder assembly 18 comprises two stems or piston rods 34 and 36.

The piston rod 34 has an upper end 40 and a lower end 42. The upper end 40 of the piston rod 34 is secured in a lower side of a through hole 44 of the piston 32 by means of a screw 46. The lower end 42 of the piston rod 34 extends through a central opening 50 provided on the lower end headplate 26 of the cylinder 22.

At the lower end 42 of the piston rod 34 there is integrally provided a downwardly depending pin member 52. The base surface of the lower end 42 of the piston rod 34 is dimensioned so as to contact the upper surface of the flange head portion of a Tee-nut 12 over its entire surface. The pin member 52 is dimensioned so as to fit within the threaded sleeve portion of the Tee-nut 12, as illustrated in FIG. 2.

In order to provide a positive stop of the piston 32 and to precisely regulate the point at which it stops its power or downward stroke, an annular buffer block 54 is provided in the lower end of the cylinder 22. The annular buffer block 54 defines a central opening through which the piston rod 34 is received. The annular buffer block 54 is secured on the inner surface of the lower end headplate 26 which is in turn secured at the lower end of the cylinder 22 by any suitable fastening means, such as a screw 56.

The buffer 54 is preferably formed of firm but resilient synthetic material such as polyurethane, which is sufficiently firm enough to withstand repeated blows from the piston 32, but yet will not damage or wear the lower surface of the piston 32.

The piston rod 36 has an upper end 60 and a lower end 62. The lower end 62 of the piston rod 36 is secured in an upper side of the through hole 44 of the piston 32 by means of a screw 64.

The upper end 60 of the piston rod 36 extends through a central opening 66 provided on the upper end headplate 24 of the cylinder 22.

It can be seen in FIG. 2 that the length of the piston rod 36 is longer than the length of the piston rod 34. The piston rod 36 is so positioned that it is in a co-axial relationship with the piston rod 34 and that the lower end surface 68 of the piston rod 36 is abutted against the upper end surface 48 of the piston rod 34 within the through hole 44 of the piston 32, so that the piston rods 34 and 36 are contiguous. It is appreciated that the piston rods 34 and 36 have the same diameter.

In order to provide a positive stop of the piston 32 and to precisely regulate the point at which it stops its upward stroke, an annular buffer block 74 is located in the upper end of the cylinder 22. The annular buffer block 74 defines a central opening to receive the piston rod 36.

Similarly to the annular buffer block 54, the annular buffer block 74 is formed of firm but resilient synthetic material which is sufficiently firm enough to withstand repeated blows from the piston 32, but yet will not damage or wear the upper surface of the piston 32.

According to a preferred embodiment of the present invention, the upper end headplate 24 comprises an annular shoulder portion 76 and an annular collar portion 78 integrally provided on and extending outwardly from the shoulder portion 76. The annular shoulder portion 76 and the annular collar portion 78 define the central opening 66 through which the piston rod 36 is received.

The central opening 66 extends axially from the shoulder portion 76 to the collar portion 78. It is adapted to better support and guide the reciprocal movement of the piston rod 36.

An annular flange portion 80 is integrally provided on the annular shoulder portion 76 so that the annular flange portion 80 is adapted to fit on top of the rim of the upper opening of the cylinder 22. Fastening means, such as screws 82, are employed to fasten the upper end headplate 24 at the upper end of the cylinder 22.

A weight 84, preferably made of solid metal, is adapted to be detachably secured to the upper end 60 of the piston rod 36. According to the present embodiment, the weight 84 is cylindrical in shape having a diameter substantially equal to the diameter of the piston 32. The weight 84 is arranged in a co-axial relationship with the piston rods 34, 36 so that the force of the weight 84 is exerted vertically downwards on the piston rods 34, 36. However, it is understood that the weight 84 may be of any other shapes and dimensions, without departing from the scope of the present invention.

A bore 86 is provided at an end of the weight 84 for receiving the upper end 60 of the piston rod 36. The weight 84 is releasably secured to the upper end 60 of the piston rod 36 by means of a screw 88.

The weight 84 being a kinetic energy storage unit serves to provide a mass on the piston rods 34, 36 which is accelerated by gravity and air pressure during a downward stroke of the piston 32 and provides kinetic energy and different air pressures for driving a Tee-nut 12 into the workpiece W.

Different weights and different air pressures adapted to produce variable impacts may be employed for different operations and different workpieces, to finely adjust the depth of the insertion of the Tee-nut.

Two different weights 84' and 84" of different dimensions and weights are shown in FIG. 2.

The weight 84' has the same diameter as the weight 84, but has a shorter length. The weight 84' also has a bore 86' for receiving the upper end 60 of the piston rod 36, and a screw 88' for detachably fastening the weight 84' onto the upper end 60 of the piston rod 36. Obviously, the weight of the weight 84' is less than that of the weight 84.

The weight 84" also has the same diameter as the weight 84 and 84,' but has a much shorter length. The weight 84" also has a bore 86" for receiving the upper end 60 of the piston rod 36, and a screw 88" for detachably fastening the weight 84" onto the upper end 60 of the piston rod 36. Obviously, the weight of the weight 84" is less than that of the weight 84'.

According to the present embodiment, the piston 32 is actuated by compressed air being fed from a compressed air supply source. When the compressed air is fed into the cylinder 22 through the hose 28, the piston 32 is forced downwards until it is stopped by the buffer block 54 in the lower end of the cylinder 22. On the return stroke when compressed air is fed into the cylinder 22 through the hose 30, the piston 32 is forced upwards until it is stopped by the buffer block 74 in the upper end of the cylinder 22.

During a downward or power stroke, relatively low pressure compressed air coming from the hose 28 accelerates the piston 32 and the kinetic energy storage unit 84 sufficiently such that the impact of the piston 32 and the kinetic energy storage unit 84 drives a Tee-nut 12 into a workpiece W with a very low shock effect, and to a precise depth. This optimizes the operation of the punching and driving in of the Tee-nut 12 in a positive and repeatable precise fashion, without causing damage to the workpiece W, the Tee-nuts 12, or the machine.

The low velocity high mass force exerted on a Tee-nut is most suitable for driving a Tee-nut into a workpiece made of soft wood or other low density materials.

This low velocity high mass force exerted on a Tee-nut is also suitable for driving a Tee-nut into a pre-drilled hole in a workpiece where minimum insertion force is required.

The low velocity impact of the insertion machine on a workpiece also causes less noise and less vibration on the workpiece during the impact.

Figure 3A:
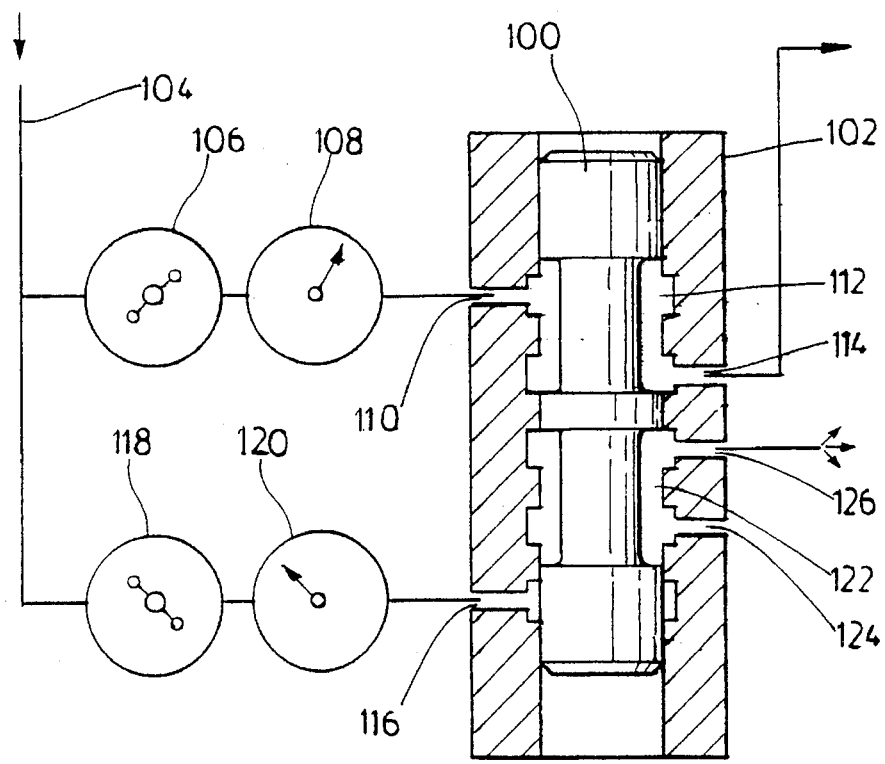
FIGS. 3A and 3B are illustrative diagrams showing a compressed air system for use in the Tee-nut insertion machine of the present invention.
Figure 3B:
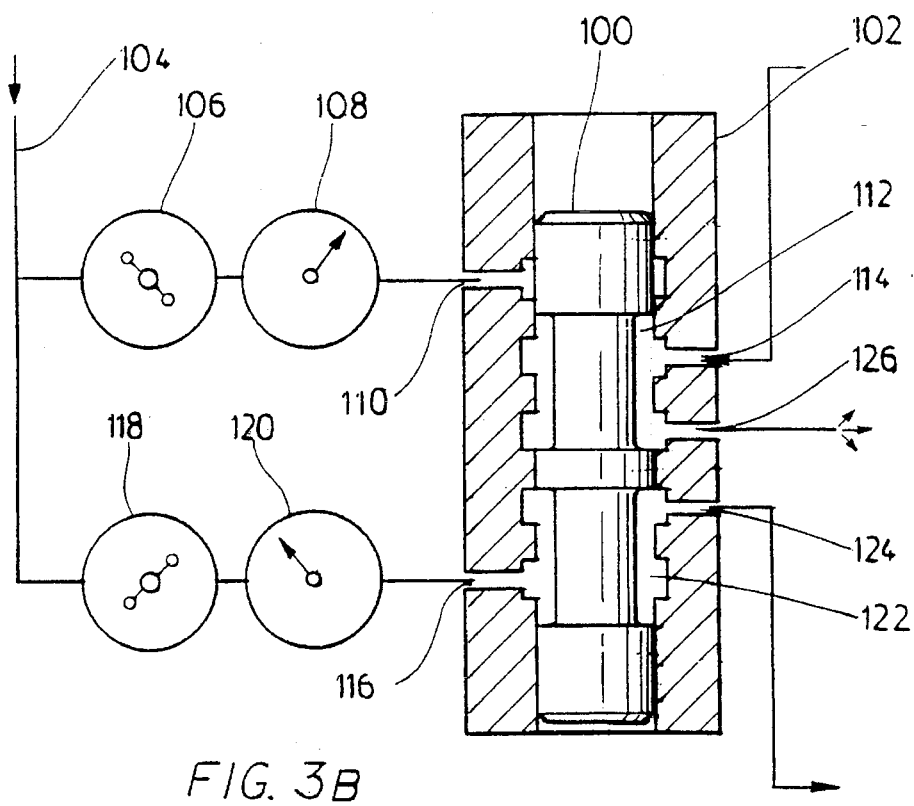

FIGS. 3A and 3B show a compressed air system for use in the variable impact Tee-nut insertion machine of the present invention.

A valve piston 100 is reciprocally moveable within a valve cylinder 102 actuated either by a pilot valve or other mechanical means (not shown).

In the valve position in FIG. 3A, compressed air is fed into the compressed air system from a compressed air supply line 104. The compressed air passes through a regulator 106 and a pressure gauge 108 and enters the valve cylinder 102 through a port or bore 110, as shown in FIG. 3A. The compressed air enters the annular valve chamber 112. The compressed air in the annular valve chamber 112 passes through a port or bore 114 and enters the cylinder 22 through the hose 28. The compressed air entered the cylinder 22 through the hose 28 forces the piston 32 to move downwards in a downward or power stroke.

When the valve piston 100 is moved to the position in FIG. 3B, it closes the bore 110 and opens a port or bore 116, as shown in FIG. 3B. The compressed air is now fed from the compressed air supply line 104 through a regulator 118 and a pressure gauge 120. The compressed air enters an annular valve chamber 122 in the valve cylinder 102 through the bore 116. The compressed air in the annular valve chamber 122 then passes through a port or bore 124 and enters the cylinder 22 through the hose 30.

The return air pressure is usually substantially lower than the insertion pressure, as shown. This reduces the noise caused by the air pressure in the machine.

An air exhaust port or bore 126 is provided between the bores 114 and 124 in order to provide a smooth exhaust of the spent air which returns from the lower or upper part of the cylinder 22 during the full cycle of the piston driver unit.

According to the present invention, the impact of the piston 32 and the kinetic energy storage unit 84 on a workpiece W can be varied and adjusted by changing the air pressure or the weight of the kinetic energy storage unit 84 in order to get the exact insertion depth required.

Air cylinders used for the insertion of a Tee-nut into a workpiece are already in wide use. Such existing cylinders can be modified and retrofitted according to the invention.

As illustrated in FIG. 4, this retrofitting is achieved by removing an upper end headplate 130 of an existing cylinder 132, securing an additional stem or piston rod 134 (shown in phantom) to an upper portion 136 of a piston 138 in a co-axial relationship with an existing piston rod 140 being secured to a lower portion 142 of the piston 138, installing the headplate 130 back in position or replacing it by a modified headplate 128 (shown in phantom), and finally securing an additional weight 144 (shown in phantom) at an upwardly and outwardly extending end 146 of the additional piston rod 134 by means of screws 148 (shown in phantom).

Additional mass is thus attached to the piston 138 and lower air pressure is required in order to produce the necessary force to insert a Tee-nut into a workpiece, at a relatively low velocity.

Thus according to the above procedures, an existing relatively high velocity Tee-nut insertion machine can be easily retrofitted and converted to a relatively low velocity Tee-nut insertion machine.

Control valve and pressure regulator units may be installed during retrofitting of the existing machine so that the air pressure entering the cylinder 22 during an upward or a downward stroke can be controlled and regulated as desired.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A machine for inserting a Tee-nut into a workpiece of the type having means for supporting said workpiece, means for supplying Tee-nuts to the machine, and means for driving said Tee-nut into said workpiece, said driving means comprising:

cylinder means having a first end member and a second end member;

openings means provided on said cylinder means for admitting and venting compressed air from a compressed air supply source;

piston means moveable within said cylinder means by said compressed air;

piston rod means being secured to said piston means, one end of said piston rod means extending through said first end member of said cylinder and being adapted to engage and drive said Tee-nut into said workpiece, and the other end of said piston rod means extending through said second end member of said cylinder means; and weight means removeably mounted to said other end of said piston rod means, thereby providing predetermined mass on said piston means at a downward stroke for driving said Tee-nut into said workpiece by the use of low air pressure and high mass energy.

2. A machine for inserting a Tee-nut into a workpiece as claimed in claim 1 wherein said piston rod means is in the form of:

a first piston rod being secured to said piston means at one end of said first piston rod, and the other end of said first piston rod extending out through said first end member of said cylinder means, said other end of said first piston rod being adapted to engage and drive said Tee-nut into said workpiece; and a second piston rod being secured to said piston means at one end of said second piston rod, and the other end of said second piston rod extending out through said second end member of said cylinder means, said second piston rod extending contiguously from and disposed in a co-axial relationship with said first piston rod.

3. A machine for inserting a Tee-nut into a workpiece as claimed in claim 1 wherein said piston rod means is in the form of a single solid metal rod.

4. A machine for inserting a Tee-nut into a workpiece as claimed in claim 1 wherein said weight means comprises a bore at one end thereof for receiving said other end of said second piston rod means.

5. A machine for inserting a Tee-nut into a workpiece as claimed in claim 4 wherein said weight means further comprises means for releasably fastening said weight means to said other end of said second piston rod means.

6. A machine for inserting a Tee-nut into a workpiece as claimed in claim 1 wherein said weight means is cylindrical in shape and is disposed in a co-axial relationship with said piston rod means.

7. A machine for inserting a Tee-nut into a workpiece as claimed in claim 1 wherein said weight means is made of solid metal.

8. A machine for inserting a Tee-nut into a workpiece as claimed in claim 1 wherein said first end member is in the form of a headplate having a central bore for receiving therethrough said one end of said piston rod means.

9. A machine for inserting a Tee-nut into a workpiece as claimed in claim 1 wherein said second end member is in the form of a headplate having a central bore for receiving therethrough said other end of said piston rod means.

10. A machine for inserting a Tee-nut into a workpiece as claimed in claim 9 wherein said headplate further comprises an integral collar member extending outwardly therefrom, said collar member defining an elongated bore extending continuously from said central bore of the second end member headplate.

11. A machine for inserting a Tee-nut into a workpiece as claimed in claim 1 wherein said piston means defines a central through hole for receiving said piston rod means.

12. A machine for inserting a Tee-nut into a workpiece as claimed in claim 1 further comprising means for fastening said piston rod means to said piston means.

13. A machine for inserting a Tee-nut into a workpiece as claimed in claim 1 further comprising buffer means provided in both ends of said cylinder means.

14. A machine for inserting a Tee-nut into a workpiece as claimed in claim 1 further comprising valve means for controlling said compressed air and means for regulating the pressure of said compressed air.

15. A kit for retrofitting a machine for inserting a Tee-nut into a workpiece of the type having a cylinder means, said cylinder means having an upper end headplate and a lower end headplate, piston means moveable within said cylinder means, piston rod means being secured to said piston means at one end of said piston rod means, and the other end of said piston rod means extending out through said lower end headplate of said cylinder means, said other end of said piston rod means being adapted to engage and drive a said Tee-nut into said workpiece, said kit comprising:

piston rod extension means adapted to be secured to said piston means at one end of said piston rod extension means, and the other end of said piston rod extension means extending out through said upper end headplate of said cylinder means at the other end thereof, said piston rod extension means adapted to be disposed in a co-axial relationship with said piston rod means of said machine; and a plurality of weight means adapted to be selectively mounted to said other end of said piston rod extension means, thereby providing a predetermined mass on said piston means at a downward stroke for driving said Tee-nut into said workpiece by use of low air pressure and high mass energy.

16. A kit for retrofitting a Tee-nut insertion machine as claimed in claim 15 wherein said plurality of weight means have different weights.

17. A kit for retrofitting a Tee-nut insertion machine as claimed in claim 15 further comprising an upper headplate having an integral collar member extending outwardly therefrom, said collar member defining an elongated bore for receiving said piston rod extension means therethrough.

18. A kit for retrofitting a Tee-nut insertion machine as claimed in claim 15 further comprising means for releasably securing said weight means to said other end of said piston rod extension means.

19. A kit for retrofitting a Tee-nut insertion machine as claimed in claim 15 further comprising means for fastening said one end of said piston rod extension means to said piston means.

20. A kit for retrofitting a Tee-nut insertion machine as claimed in claim 15 further comprising means for fastening said upper headplate with integral collar member to said cylinder means.

* * * * *